United States Patent [19]

Tucker

[11] Patent Number: 5,394,617
[45] Date of Patent: Mar. 7, 1995

[54] EYEWEAR LENS MECHANICAL CENTER LOCATING APPARATUS

[76] Inventor: Bernard W. Tucker, 3221 Bluffview Ct., #102, Woodbridge, Va. 22192

[21] Appl. No.: 105,601

[22] Filed: Aug. 12, 1993

[51] Int. Cl.$^6$ .............................................. G01B 5/00
[52] U.S. Cl. ...................................... 33/507; 33/644; 33/672
[58] Field of Search ............... 33/1 F, 200, 507, 644, 33/670, 671, 672, 673, 679; 351/204

[56] References Cited

U.S. PATENT DOCUMENTS

| | | | |
|---|---|---|---|
| 539,688 | 5/1895 | Kolb | 33/672 |
| 563,745 | 7/1896 | Cole . | |
| 790,059 | 5/1905 | Howland . | |
| 996,663 | 7/1911 | Myers | 33/507 |
| 1,292,121 | 1/1919 | Stead | 33/507 |
| 2,086,765 | 7/1937 | Burrows | 33/507 |
| 2,133,589 | 10/1938 | Sterling | 235/88 |
| 2,348,878 | 5/1944 | Behen | 33/672 |
| 2,582,048 | 1/1952 | Line | 33/507 |
| 3,981,081 | 9/1976 | Welch | 33/200 |
| 4,077,722 | 3/1978 | Bieskei | 356/127 |
| 4,084,325 | 4/1978 | Jones, Jr. | 33/670 |
| 4,252,419 | 2/1981 | Padula, II et al. | 33/200 |
| 4,693,573 | 9/1987 | Zoueki | 351/204 |

FOREIGN PATENT DOCUMENTS 0495723  6/1955  Italy ..................... 33/670

OTHER PUBLICATIONS

"The Boxing System of Lens and Frame Measurement", Reprinted from The Optical Journal and Review of Optometry, pp. 1-14, Jul. 1961.

Primary Examiner—Thomas B. Will
Attorney, Agent, or Firm—John R. Flanagan

[57] ABSTRACT

An apparatus for locating the geometrical center of a lens, whether in or out of an eyewear frame, includes a flat platform adapted to seat an eyewear lens thereon and a framework mounted on the platform and having first and second pairs of opposite side members extending in substantially orthogonal relationship to one another and intersecting with one another so as to define a substantially rectangular enclosure having first and second pairs of diagonal corners. The side members of the pairs thereof are mounted to the platform for undergoing relative movement so as to adjust the distances therebetween and thereby the length and width of the enclosure to fit about the lens seated on the platform. The apparatus also includes a plurality of positioning elements each mounted to one of the side members of the first and second pairs thereof for undergoing slidable movement therealong so as together to engage and retain the lens on the platform within the rectangular enclosure, and a pair of cross members pivotally coupled to the framework at the pairs of diagonal corners thereof such that the cross members extend diagonally across the enclosure and intersect with one another at a center point of the enclosure and thereby at the geometrical center of the lens seated on the platform within the enclosure.

18 Claims, 2 Drawing Sheets

EYEWEAR LENS MECHANICAL CENTER LOCATING APPARATUS

BACKGROUND OF THE INVENTION

1. Field of the Invention

The present invention generally relates to lens measuring instruments and, more particularly, is concerned with an eyewear lens mechanical or geometrical center locating apparatus.

2. Description of the Prior Art

Over the past century, various techniques have been employed in the art to locate the center of lenses in eyewear. The primary purpose in locating the center of the lenses is to make the distance between the centers of the lenses correspond to the wearer's interpupillary distance, that is, the distance between the pupils of the wearer's eyes.

One technique for determining the lens center is to use a measuring instrument having components in the form of circular protractor plates. Representative examples of such measuring instruments are the ones disclosed in U.S. Pat. No. 563,745 to Cole and U.S. Pat. No. 790,059 to Howland.

Another technique is to use a graphical device for determining the center of the lens. A representative example of such device is the one disclosed in U.S. Pat. No. 2,133,589 to Sterling.

Yet another technique for finding the lens center is to use a device having one or more movable members for positioning a lens being mounted on a support plate. Representative examples of such positioning devices are the ones disclosed in U.S. Pat. No. 3,981,081 to Welch, U.S. Pat. No. 4,077,722 to Bieskei and U.S. Pat. No. 4,693,573 to Zoueki.

For instance, the Welch patent discloses a lens measuring instrument utilizing a base plate, a L-shaped measuring member and a dial indicator attached to the measuring member that provides indicia regarding the distance between the measuring member and a reference member, both of which are supported on a transparent base. The Zoueki patent discloses an universal frame centering, holding and measuring device with a frame holder mounted on a base and two slidable rulers mounted perpendicular to the holder. There are vertical gradation indicia on the rulers for transcribing and checking of interpupillary distance.

While the aforementioned techniques may have functioned satisfactorily under the limited range of conditions for which they were designed, they share similar drawbacks in terms of their complexity to use and reliance on operator skill to achieve the desired level of accuracy. Consequently, a need still exists for an improved technique for locating the mechanical or geometrical center of an eyewear lens.

SUMMARY OF THE INVENTION

The present invention provides an eyewear lens mechanical or geometrical center locating apparatus designed to satisfy the aforementioned need. The lens center locating apparatus of the present invention utilizes a geometrical proposition which states that if a rectangular box is drawn so as to enclose a circle and a pair of lines are drawn diagonally between opposite corners of the box, then the mechanical or geometrical center of the circle lies at the intersection of the diagonal lines. The lens center locating apparatus defines a rectangular frame being adjustable in length and width and having a pair of intersecting diagonal lines capable of fitting any lens of any given shape and of locating the mechanical or geometrical center of the circular blank from which the lens was made and, thus, the center of the lens itself, at the point where the intersecting diagonal lines cross one another.

The lens center locating apparatus of the present invention has an ease of use in marking the mechanical centers of lenses which reduces substantially the degree of operator skill required and thus takes the human error factor out of eyewear frame measurements. As a result, the mechanical centers of lenses can be precisely located and marked so as to facilitate the taking of accurate measurements for use in decentering the optical center of opthalmic lenses to correspond to an individual's interpupillary distance.

Accordingly, the present invention is directed to an apparatus for locating a geometrical center of a lens. The center locating apparatus comprises: (a) a platform adapted to seat a lens thereon; (b) means for defining a substantially rectangular enclosure on the platform having first and second pairs of diagonal corners and being adjustable in length and width to fit about the lens on the platform; (c) means coupled with the rectangular enclosure defining means for engaging the lens and retaining the lens within the rectangular enclosure; and (d) a pair of cross members coupled to the rectangular enclosure defining means at the pairs of diagonal corners thereof such that the cross members extend diagonally across the rectangular enclosure and intersect with one another at a center point of the rectangular enclosure and thereby at a geometrical center of the lens on the platform and retained within the rectangular enclosure by the engaging and retaining means. Also, each cross members has an elongated slot defined therein and extending longitudinally between opposite ends of the cross member such that at the intersection of the slots of the cross members an aperture is formed which receive a tip of a marking instrument to make a mark identifying the mechanical center of the lens.

More particularly, the rectangular enclosure defining means is a framework mounted on the platform. The framework has first and second pairs of opposite side members extending in substantially orthogonal relationship to one another and intersecting with one another so as to define the rectangular enclosure and first and second pairs of diagonal corners thereof. The rectangular enclosure defining means also includes means mounting at least some of the side members to the platform for moving relative to the platform and to one another so as to adjust the distances therebetween and thereby the length and width of the rectangular enclosure to fit about the lens on the platform.

Further, the engaging and retaining means includes a plurality of positioning elements each being mounted to one of the side members of the first and second pairs thereof and adapted to undergo slidable movement therealong such that together the positioning elements engage angularly spaced edge portions of the lens so as to thereby confine the lens on the platform within the rectangular enclosure. Also, the cross members are pivotally and slidably coupled to the framework at the pairs of diagonal corners such that the cross members extend diagonally across the rectangular enclosure and intersect with one another at the center point of the rectangular enclosure concurrently as the distances between the side members are adjusted relative to one another.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
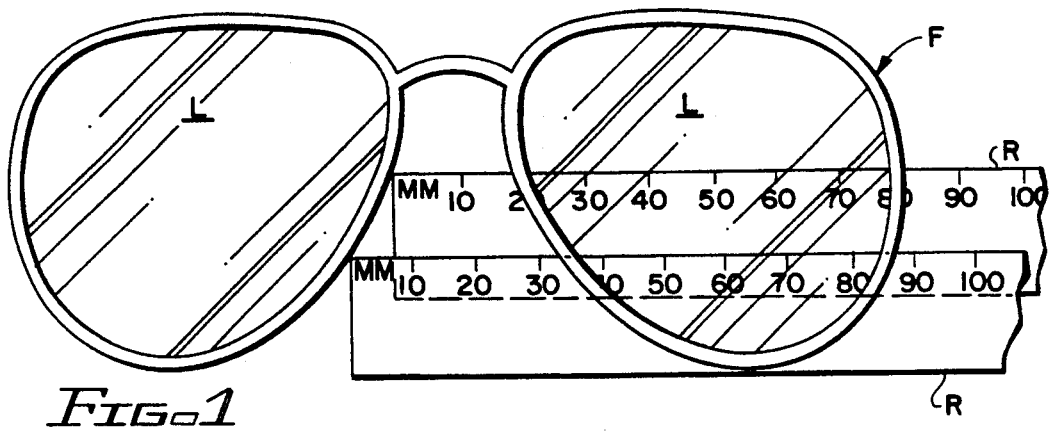
FIG. 1 is a front view of a standard method of measuring the distance between the centers of lenses in a pair of eyewear frames by use of a ruler and relying on the degree of skill of the person making the measurement.

Referring to the drawings and particularly to FIG. 1, there is illustrated a standard method of measuring the distance between the centers of lenses L in an eyewear frame F by merely employing a ruler R and relying on the high degree of skill of the person performing the measurements. From the two different placements of the ruler R shown in FIG. 1, it can be readily understood how dependence on human skill in locating the centers of the lenses L and in making accurate measurements can frequently result in human error and in erroneous measurements being made.

Referring to FIGS. 2 and 4-7, there is illustrated an apparatus of the present invention for locating the mechanical, or geometrical, center of a lens L, being generally designated 10. Basically, the lens center locating apparatus 10 includes a flat platform 12, such as a tray or the like, being adapted to seat and support a lens L thereon (either removed from or in a eyewear frame F), a rectangular enclosure defining means 14, a lens engaging and retaining means 16, and a pair of cross members 18, 20.

Figure 8:
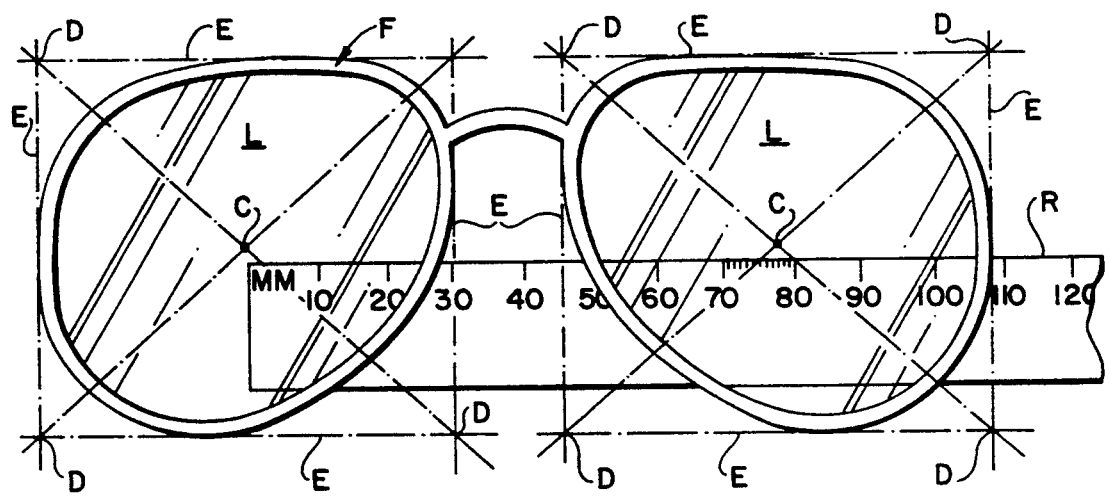
FIG. 8 is a front view of an eyewear frame showing measurement of the distance between the centers of the lenses having been marked on the lenses by employment of the center locating apparatus of the present invention.

The rectangular enclosure defining means 14 of the center locating apparatus 10 includes a framework 22 mounted on the platform 12. The framework 22 includes first and second pairs of opposite side members 24, 26 and 28, 30. The side members 24, 26 and 28, 30 in each pair thereof extend substantially parallel to one another, whereas the side members 24, 26 of one pair extend in substantially right-angle or orthogonal relationship to the respective side members 28, 30 of the other pair. The respective pairs of side members 24, 26 and 28, 30 intersect with one another and thereby define the rectangular enclosure E and the first and second pairs of diagonal corners D, as depicted in FIG. 8, which respectively encompass and cross each of the lenses L contained in the eyewear frame F in FIG. 8 and thereby locate and identify the geometrical centers C thereof.

More particularly, the first pair of side members 24, 26 of the framework 22 are a pair of first tracks 24, 26 defined on the platform 12 in substantially parallel relationship to one another. The one first track 24 is in the form of an elongated stationary groove 32 defined on the platform 12. The other first track 26 is in the form of an elongated first rail 34 movable relative to the platform 12 and the one first track 24 and having an elongated groove 36 defined thereon, being aligned in generally parallel relation to the groove 32 of the one first track 24.

The second pair of side members 28, 30 of the framework 22 are a pair of second tracks 28, 30 defined on the platform 12 in substantially parallel relationship to one another. The one second track 28 is in the form of an elongated second rail 38 stationarily positioned on the platform 12 and having an elongated groove 40 defined therein. The other second track 30 is in the form of an elongated third rail 42 movable relative to the platform 12 and the one second track 28 and having an elongated groove 44 defined thereon, being aligned in generally parallel relation to the groove 40 of the one second track 28.

Figure 2:
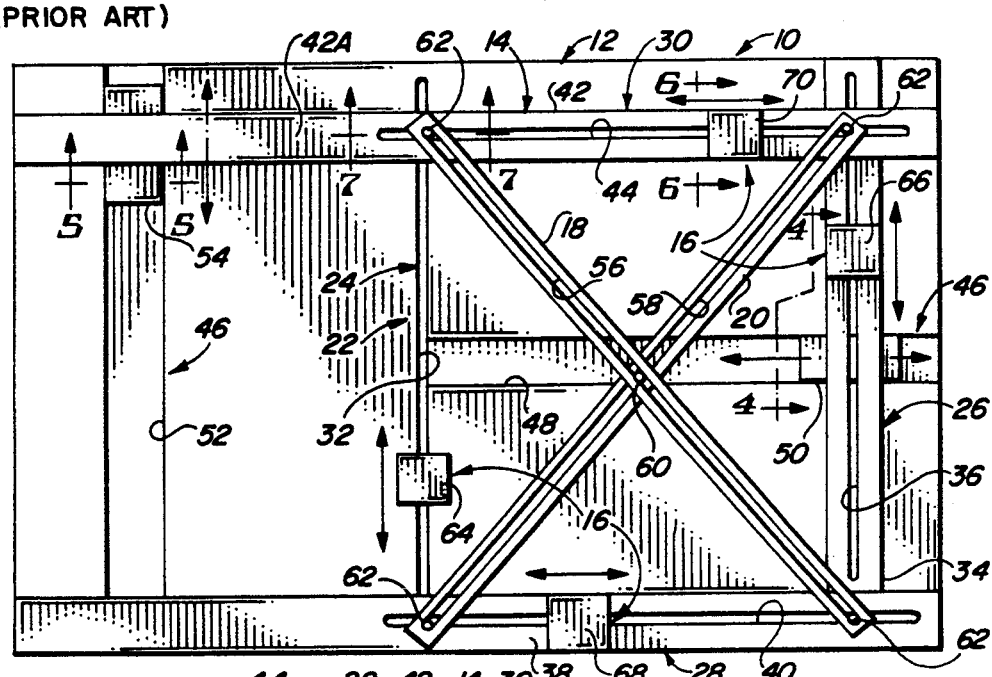
FIG. 2 is a plan view of the lens mechanical center locating apparatus of the present invention.
Figure 4:
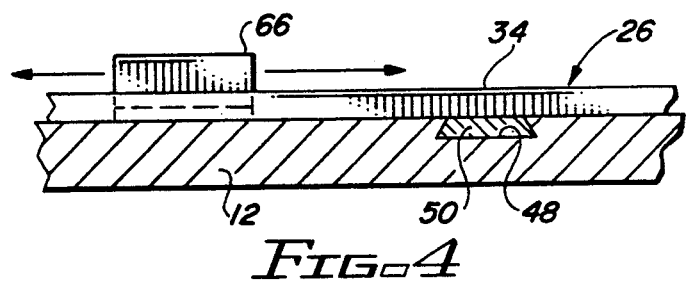
FIG. 4 is an enlarged cross-sectional view of the lens center locating apparatus taken along line 4—4 of FIG. 2.
Figure 5:
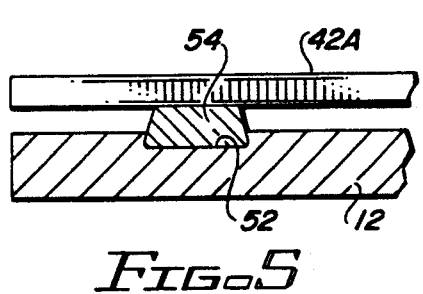
FIG. 5 is another enlarged cross-sectional view of the lens center locating apparatus taken along line 5—5 of FIG. 2.

Referring to FIGS. 2, 4 and 5, in addition to the above-described framework 22, the rectangular enclosure defining means 14 also includes an arrangement 46 for mounting the other first and second tracks 26, 30 to the platform 12 for undergoing movement relative to the platform 12 and to one another so as to adjust the distances therebetween and thereby the length and width of the rectangular enclosure E to fit about the lens L on the platform 12. More particularly, the mounting arrangement 46 includes an elongated first guide channel 48 defined in the platform 12 between and extending parallel to the pair of second tracks 28, 30. The first guide channel 48 crosses under the first rail 34. The first rail 34 has a first slide member 50 attached on its underside which slidably fits within the first guide channel 48. Also, the mounting arrangement 46 includes an elongated second guide channel 52 defined in the platform 12 and extending parallel to the pair of first tracks 24, 26 and spaced from a side of the groove 32 thereof being opposite from the first rail 34. An extension 42A of the third rail 42 of the other second track 30 crosses above the second guide channel 52 and has a second slide member 54 attached on its underside which slidably fits within the second guide channel 52.

As seen respectively in FIGS. 4 and 5, the first guide channel 48 and slide member 50 and the second guide channel 52 and slide member 54 have respective dovetail-shaped cross-sectional configurations which retain the slide members 50, 54 in the respective guide channels 48, 52. Thus, the first and second guide channels 48, 52 are provided on the platform 12 to guide the respective movements of the first rail 34 toward and away from the groove 32 and of the third rail 42 toward and away from the second rail 38. Such movements permit the adjustment of the respective distances therebetween and thereby of the length and width of the enclosure E to fit about the particular lens L on the platform 12.

The cross members 18, 20 of the center locating apparatus 10 are coupled to the pairs of first and second side members 24, 26 and 28, 30 of the framework 22 at the pairs of diagonal corners D such that the cross members 18, 20 extend diagonally across the rectangular enclosure E and intersect with one another at the center point C of the rectangular enclosure E concurrently as the distances between the side members 24, 26 and 28, 30 are adjusted relative to one another. Each cross member 18, 20 has an elongated slot 56, 58 defined therein extending longitudinally between opposite ends of the cross member 18, 20 such that at the intersection of the slots 56, 58 of the cross members 18, 20 an aperture 60 is formed which can receive a tip of a marking instrument (not shown) to make a mark C (see FIG. 8) identifying the mechanical, or geometrical, center C of the lens L.

Figure 7:
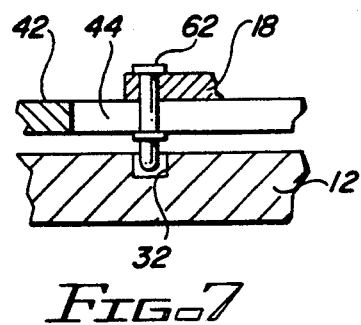
FIG. 7 is yet another enlarged cross-sectional view of the lens center locating apparatus taken along line 7—7 of FIG. 2.

More particularly, referring to FIGS. 2 and 7, the cross members 18, 20 are pivotally and slidably coupled to the first and second tracks 24, 26 and 28, 30 at the pairs of diagonal corners D of the enclosure E by respective pivot pins 62 such that the cross members 18, 20 will extend diagonally across the rectangular enclosure E and intersect with one another at the center point C of the enclosure E and thereby at the geometrical center of the lens L on the platform 12 and retained within the rectangular enclosure E by the engaging and retaining means 16.

Figure 3:
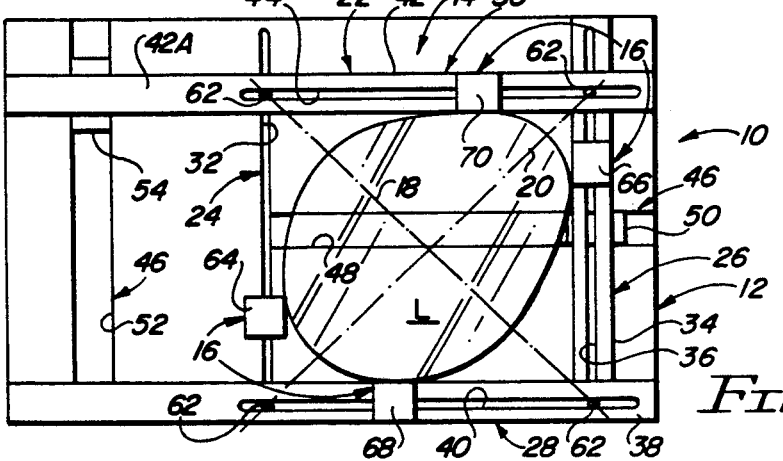
FIG. 3 is a plan view of the lens center locating apparatus after adjustment to locate the center of a lens of one particular shape.
Figure 6:
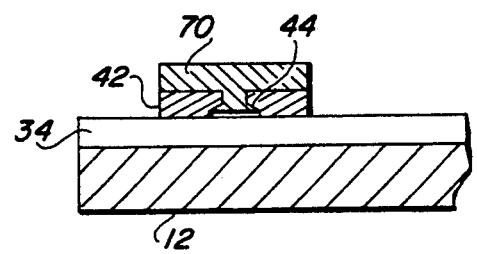
FIG. 6 is still another enlarged cross-sectional view of the lens center locating apparatus taken along line 6—6 of FIG. 2.

Referring to FIGS. 2–4 and 6, the lens engaging and retaining means 16 of the center locating apparatus 10 includes a pairs of first and second positioning elements 64, 66 and 68, 70 coupled with the pairs of first and second side members 24, 26 and 28, 30 for engaging the lens L and retaining the lens L within the rectangular enclosure E. The pair of first positioning elements 64, 66 are mounted by connections having dovetail cross-sectional shapes, as seen in FIG. 6, respectively to the grooves 32, 36 of the first tracks 24, 26, whereas the pair of second positioning elements 68, 70 are mounted respectively to the grooves 40, 44 of the second tracks 28, 30. The first and second positioning elements 64, 66 and 68, 70 are adapted to undergo slidable movement along the respective grooves 32, 36 and 40, 44 such that together the positioning elements 64, 66 and,. 68, 70 engage angularly spaced edge portions of the lens L, as seen in FIG. 3, so as to thereby to confine the lens L on the platform 12 within the rectangular enclosure E.

Referring to FIG. 8, there is shown the centers C of lenses L of an eyewear frame F having been precisely identified and marked by employment of the center locating apparatus 10 of the present invention. Once the centers C of the lenses L have been precisely marked, then accurate measurement of the distance between the centers C of the lenses L can be taken merely by using a ruler R.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An apparatus for locating a geometrical center of a lens, said apparatus comprising:
   (a) a platform adapted to seat a lens thereon;
   (b) means for defining a substantially rectangular enclosure on said platform having first and second pairs of diagonal corners and being adjustable in length and width to fit about the lens seated on said platform;
   (c) means coupled with said rectangular enclosure defining means for engaging the lens and retaining the lens within said rectangular enclosure; and
   (d) a pair of cross members coupled to said rectangular enclosure defining means at said pairs of diagonal corners thereof such that said cross members extend diagonally across said rectangular enclosure and intersect with one another at a center point of said rectangular enclosure and thereby at a geometrical center of the lens on said platform and retained within said rectangular enclosure by said engaging and retaining means;
   (e) said rectangular enclosure defining means being a framework mounted on said platform, said framework having first and second pairs of opposite side members extending in substantially orthogonal relationship to one another and intersecting with one another so as to define said rectangular enclosure and said first and second pairs of diagonal corners thereof;
   (f) said engaging and retaining means including a plurality of positioning elements each mounted to one of said side members of said first and second pairs thereof and adapted to undergo slidable movement therealong such that together said positioning elements engage angularly spaced edge portions of the lens so as to thereby confine the lens on said platform within said enclosure.

2. The apparatus of claim 1 wherein each of said cross members has an elongated slot defined therein and extending longitudinally between opposite ends of said cross member such that at the intersection of said slots of said cross members an aperture is formed being capable of receiving a tip of a marking instrument to make a mark identifying the geometrical center of the lens.

3. The apparatus of claim 1 wherein said rectangular enclosure defining means also includes means mounting at least one of said side members of each of said first and second pairs thereof to said platform for moving relative to said platform and to one another so as to adjust the distances therebetween and thereby the length and width of said enclosure to fit about the lens on said platform.

4. The apparatus of claim 1 wherein said first pair of side members are a pair of first tracks defined on said platform in substantially parallel relationship to one another, one of said first tracks being defined in a stationary position on said platform and the other of said first tracks being movable relative to said platform and said one first track.

5. An apparatus for locating a geometrical center of a lens, said apparatus comprising:
   (a) a platform adapted to seat a lens thereon;
   (b) means for defining a substantially rectangular enclosure on said platform having first and second pairs of diagonal corners and being adjustable in length and width to fit about the lens seated on said platform;

(c) means coupled with said rectangular enclosure defining means for engaging the lens and retaining the lens within said rectangular enclosure; and (d) a pair of cross members coupled to said rectangular enclosure defining means at said pairs of diagonal corners thereof such that said cross members extend diagonally across said rectangular enclosure and intersect with one another at a center point of said rectangular enclosure and thereby at a geometrical center of the lens on said platform and retained within said rectangular enclosure by said engaging and retaining means;

(e) said rectangular enclosure defining means being a framework mounted on said platform, said framework having first and second pairs of opposite side members extending in substantially orthogonal relationship to one another and intersecting with one another so as to define said rectangular enclosure and said first and second pairs of diagonal corners thereof;

(f) said first pair of side members being a pair of first tracks defined on said platform in substantially parallel relationship to one another, one of said first tracks being defined in a stationary position on said platform and the other of said first tracks being movable relative to said platform and said one first track;

(g) said one first track being an elongated groove defined in said platform.

6. The apparatus of claim 5 wherein said other first track is an elongated first rail having an elongated groove defined therein being aligned in generally parallel relation to said groove of said one first track.

7. The apparatus of claim 6 wherein said engaging and retaining means includes a pair of first positioning elements being mounted respective to said grooves of said pair of first tracks and adapted to undergo slidable movement therealong such that together said positioning elements engage substantially opposite edge portions of the lens.

8. The apparatus of claim 6 wherein said rectangular enclosure defining means also includes means for mounting said elongated first rail to said platform for undergoing movement relative to said platform and toward and away from said one first track so as to adjust the distance therebetween and thereby one of the length and width of said enclosure to fit about the lens on said platform.

9. The apparatus of claim 5 wherein said second pair of side members are a pair of second tracks defined on said platform in substantially parallel relationship to one another, one of said second tracks being defined in a stationary position on said platform and the other of said second tracks being movable relative to said platform and said one second track.

10. The apparatus of claim 9 wherein said one second track is an elongated second rail having an elongated groove defined therein.

11. The apparatus of claim 10 wherein said other second track is an elongated third rail having an elongated groove defined therein being aligned in generally parallel relation to said groove of said one second track.

12. An apparatus for locating a geometrical center of a lens, said apparatus comprising:

(a) a platform adapted to seat a lens thereon;

(b) means for defining a substantially rectangular enclosure on said platform having first and second pairs of diagonal corners and being adjustable in length and width to fit about the lens seated on said platform;

(c) means coupled with said rectangular enclosure defining means for engaging the lens and retaining the lens within said rectangular enclosure; and (d) a pair of cross members coupled to said rectangular enclosure defining means at said pairs of diagonal corners thereof such that said cross members extend diagonally across said rectangular enclosure and intersect with one another at a center point of said rectangular enclosure and thereby at a geometrical center of the lens on said platform and retained within said rectangular enclosure by said engaging and retaining means;

(e) said rectangular enclosure defining means being a framework mounted on said platform, said framework having first and second pairs of opposite side members extending in substantially orthogonal relationship to one another and intersecting with one another so as to define said rectangular enclosure and said first and second pairs of diagonal corners thereof;

(f) said second pair of side members being a pair of second tracks defined on said platform in substantially parallel relationship to one another, one of said second tracks being defined in a stationary position on said platform and the other of said second tracks being movable relative to said platform and said one second track;

(g) said one second track being an elongated second rail having an elongated groove defined therein;

(h) said other second track being an elongated third rail having an elongated groove defined therein being aligned in generally parallel relation to said groove of said one second track;

(i) said engaging and retaining means including a pair of second positioning elements being mounted respective to said grooves of said pair of second tracks and adapted to undergo slidable movement therealong such that together said positioning elements engage substantially opposite edge portions of the lens.

13. The apparatus of claim 12 wherein said rectangular enclosure defining means also includes means for mounting said elongated third rail to said platform for undergoing movement relative to said platform and toward and away from said second rail so as to adjust the distance therebetween and thereby one of the length and width of said enclosure to fit about the lens on said platform.

14. The apparatus of claim 12 wherein said cross members of said pair thereof are pivotally and slidably coupled to said framework at said pairs of diagonal corners thereof formed by said side members of said first and second pairs thereof such that said cross members extend diagonally across said enclosure and intersect with one another at the center point of said enclosure concurrently as the distances between said side members are adjusted relative to one another.

15. The apparatus of claim 14 wherein each of said cross members has an elongated slot defined therein and extending longitudinally between opposite ends of said cross member such that at the intersection of said slots of said cross members an aperture is formed being capable of receiving a tip of a marking instrument to make a mark identifying the geometrical center of the lens.

16. An apparatus for locating a geometrical center of an eyewear lens, comprising:

(a) a flat platform adapted to seat an eyewear lens thereon;

(b) a framework mounted on said platform and having first and second pairs of opposite side members extending in substantially orthogonal relationship to one another and intersecting with one another so as to define a substantially rectangular enclosure having first and second pairs of diagonal corners;

(c) means mounting at least one of said side members of each of said first and second pairs thereof to said platform for movement relative to said platform and to one another so as to adjust the distances therebetween and thereby the length and width of said rectangular enclosure to fit about the lens seated on said platform;

(d) a plurality of positioning elements each mounted to one of said side members of said first and second pairs thereof for undergoing slidable movement therealong so as together to engage and retain the lens on said platform within said rectangular enclosure; and (e) a pair of cross members pivotally coupled to said framework at said pairs of diagonal corners thereof such that said cross members extend diagonally across said rectangular enclosure and intersect with one another at a center point of said rectangular enclosure and thereby at a geometrical center of the lens seated on said platform and retained within said rectangular enclosure by said plurality of positioning elements, each of said cross members having an elongated slot defined therein and extending longitudinally between opposite ends of said cross member such that at the intersection of said slots of said cross members an aperture is formed being capable of receiving a tip of a marking instrument to make a mark identifying the geometrical center of the lens.

17. The apparatus of claim 16 wherein said first pair of side members are a pair of first tracks defined on said platform in substantially parallel relationship to one another, one of said first tracks being defined in a stationary position on said platform and the other of said first tracks being movable relative to said platform and said one first track, said one first track being an elongated groove defined in said platform, said other first track being an elongated first rail having an elongated groove defined therein being aligned in generally parallel relation to said groove of said one first track.

18. The apparatus of claim 16 wherein said second pair of side members are a pair of second tracks defined on said platform in substantially parallel relationship to one another, one of said second tracks being defined in a stationary position on said platform and the other of said second tracks being movable relative to said platform and said one second track, said one second track being an elongated second rail having an elongated groove defined therein, said other second track being an elongated third rail having an elongated groove defined therein being aligned in generally parallel relation to said groove of said one second track.

* * * * *